United States Patent [19]

Nishino

[11] Patent Number: 4,781,353
[45] Date of Patent: Nov. 1, 1988

[54] ADJUSTMENT DEVICE FOR A VEHICLE SEAT

[75] Inventor: Takaichi Nishino, Akishima, Japan

[73] Assignee: Tachi-S Co., Ltd., Tokyo, Japan

[21] Appl. No.: 888,799

[22] Filed: Jul. 23, 1986

[51] Int. Cl.⁴ .......................... A47C 1/023; B60N 1/08
[52] U.S. Cl. .................................... 248/395; 248/424; 297/311
[58] Field of Search ............... 248/395, 394, 393, 398, 248/397, 419, 424, 429; 297/338, 322, 311

[56] References Cited

U.S. PATENT DOCUMENTS

| 1,196,084 | 8/1916 | Cogger | 248/422 |
| 2,638,150 | 5/1953 | May | 297/338 X |
| 3,724,895 | 4/1973 | Brand | 297/338 X |
| 4,304,384 | 12/1981 | Cremer et al. | 248/424 X |

FOREIGN PATENT DOCUMENTS

| 0041218 | 3/1982 | Japan | 297/311 |
| 0170636 | 10/1983 | Japan | 297/311 |
| 0185327 | 10/1983 | Japan | 297/311 |

Primary Examiner—Ramon S. Britts
Assistant Examiner—Karen J. Chotkowski
Attorney, Agent, or Firm—Oldham, Oldham & Weber Co.

[57] ABSTRACT

An adjustment device to adjust the depth and height of a seat cushion, the longitudinal positions of a headrest and the like in a seat for use in a vehicle such as an automobile is disclosed. In the adjustment device, a rod is rotatably journaled on the side of fixed means thereof, a pair of link members are respectively fixed to the rod at the first ends thereof with the free ends thereof being connected to a movable member, there is provided in said fixed means a crankshaft having a pair of bent portions on the substantially 180° opposing sides thereof, and the bent portions of the crankshaft are respectively inserted through and engaged with slits formed in the two link members, whereby the link members are rotated by rotating the crankshaft so as to be able to move or adjust the movable member relative to the fixed means.

6 Claims, 3 Drawing Sheets

ADJUSTMENT DEVICE FOR A VEHICLE SEAT

BACKGROUND OF THE INVENTION

1. Field of the Invention

The present invention relates to an adjustment device for a vehicle seat such as an automotive seat and, more particularly, to such adjustment device which is capable of adjusting the height and depth of a seat cushion, the angles of inclination of a seat back, the longitudinal positions of a headrest and the like.

2. Description of the Prior Art

In a vehicle seat, there are provided various adjustment devices to adjust the height of a seat cushion, the angles of inclination of a seat back, the longitudinal positions of a headrest and the like, so that an occupant of the seat is able to take a desired sitting position according to his or her taste or physical condition.

Conventionally, as the adjustment device of this kind, there have been proposed and enforced various kinds of devices, in which link members supporting movable members to be adjusted are rotated using, for example, a shaft of rotation provided with a screw mechanism or a brake mechanism, or a gear mechanism. For example, in Japanese Patent Publication No. 77930 of 1984, there is disclosed an adjustment device in which a screw rod is rotated to rotate link members so that a seat cushion can be moved forwardly or rearwardly. Also, in Japanese Utility Model Publication No. 144738 of 1982, the inclination of a seat back of a vehicle seat can be adjusted by a shaft of rotation provided with a brake mechanism, and also in this Utility Model Publication there are employed a rack and pinion engaging with the rack.

However, the above-mentioned conventional adjustment devices of this kind have been found inadvantageous in some respects. That is, the adjustment devices employing the screw mechanism and the gear mechanism are complicated in structure and not easy to operate because the operation members thereof must be operated to a great extent. The devices employing the shaft of rotation provided with the brake mechanism are easy to produce a loosend condition, since the brake mechanism is provided only on one side of the shaft of rotation, resulting in insufficient locking.

SUMMARY OF THE INVENTION

The present invention aims at eliminating the drawbacks found in the above-mentioned conventional adjustment devices.

Accordingly, it is a main object of the invention to provide an adjustment device for use in a vehicle seat which is capable of adjusting the seat through a simple operation and providing a positive locking.

To attain this object, according to the invention, for example, in a seat wherein the depth of the sitting surface thereof can be varied by moving or adjusting a seat cushion, as a movable member, in a longitudinal direction relative to a seat adjuster as a fixed member, a pair of link members each having an arc-shaped slit are fixed at the respective first ends thereof to a rod journaled by side brackets on the side of the seat adjuster, with the free ends thereof being connected to the cushion frame respectively, the side brackets are provided with a crankshaft having two bent portions located on almost 180° opposing sides, and the two bent portions of the crankshaft are respectively inserted into and engaged with slits respectively formed in the two link members.

When the two link members are respectively in their neutral positions, one bent portion of the crankshaft is in engagement with the rear end of the slit in the one link member while the other bent portion thereof is in engagement with the front end of the slit in the other link member, so that the cushion frame can be held in its intermediate position.

In this state, if the crankshaft is rotated in one direction, for example, in a counterclockwise direction in FIG. 1, then the one bent portion of the crankshaft is rotated forwardly to press against the rear edge of the slit in the one link member. As a result of this, the one link member is rotated about the rod such that it is inclined forwardly. At the same time, the other link member is rotated integrally with the one link member smoothly due to the fact that the other bent portion of the crankshaft is moved through the slit. Such forward rotational movements of the two link members move or push out the cushion frame (2) forwardly relative to the side bracket.

Also, if the crankshaft is rotated in the opposite direction, then the other bent portion of the crankshaft is rotated rearwardly to press against the front edge of the slit in the other link member, which causes the other link member to rotate rearwardly. At the same time, since the one bent portion of the crankshaft is moved through the slit, the one link member is rotated integrally with the other link member without hindrance. Such rearward rotational movements of the two link members move the cushion frame rearwardly relative to the side bracket.

To rotate the two link members in the direction of their respective neutral positions after they are rotated forwardly or rearwardly, the crankshaft may be turned in its return direction. This operation is similar to the one mentioned above.

The above and other related objects and features of the invention will be apparent from a reading of the following description of the disclosure found in the accompanying drawings and the novelty thereof pointed out in the appended claims.

DETAILED DESCRIPTION OF A PREFERRED EMBODIMENT OF THE INVENTION

Figure 1:
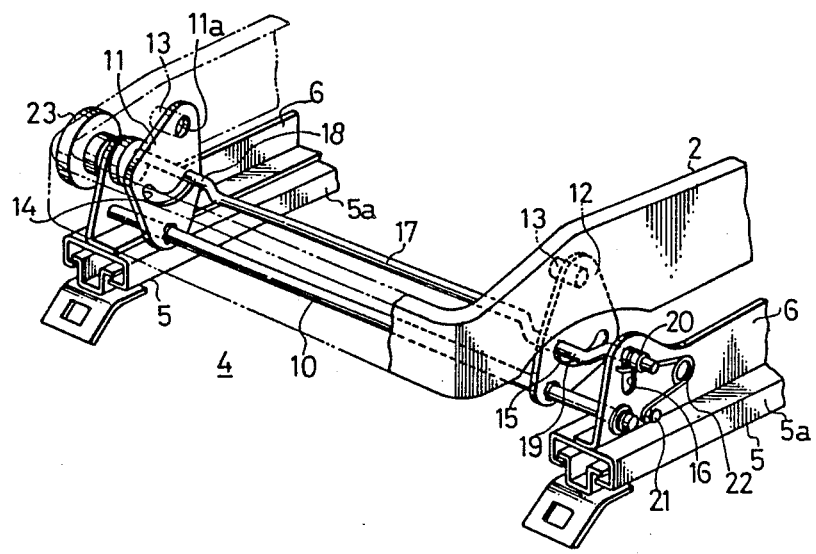
FIG. 1 is a perspective view of main portions of a seat to which the invention is applied.
Figure 2:
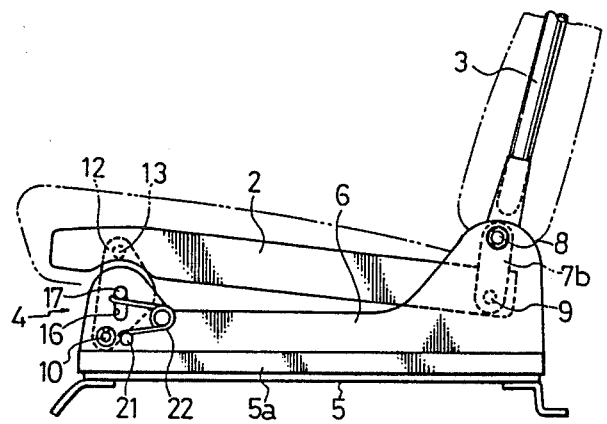
FIG. 2 is a side view of the above main portions of the seat.
Figure 3:
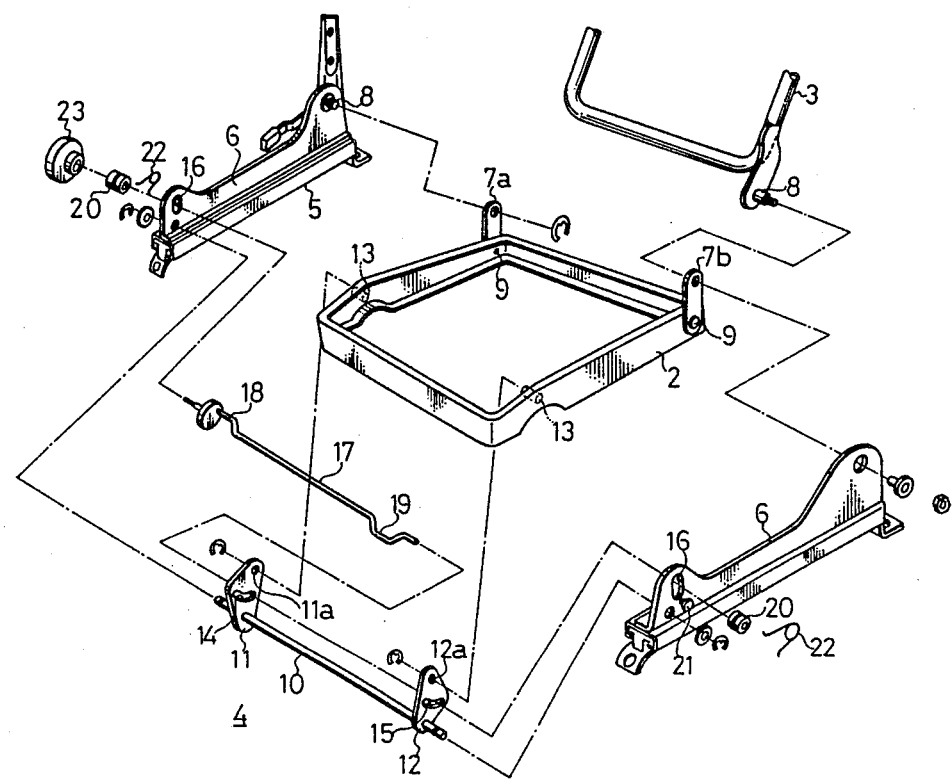
FIG. 3 is an exploded perspective view of the same.

Referring first to FIG. 1, there is shown a frame structure of a seat to which the invention is applied. In FIG. 1, reference numeral (2) designates a seat cushion frame and (3) represents a seat back frame. An adjustment device (4) constructed in accordance with the invention is provided in the front portion of the seat. The seat cushion frame (2) can be moved forwardly or rearwardly or adjusted by the adjustment device (4), whereby the depth of a seat cushion can be varied.

(5) designates a slide rail to be fixed to the side of a vehicle floor. A side bracket (6) is fixed to the top surface of an upper rail (5a) of the slide rail (5) in a manner that it extends substantially over the whole length of the upper rail (5a).

Rear links (7a) and (7b), coaxial with the back frame (3), are journaled by a shaft (8) to the rear ends of the side brackets (6) such that they can be rotated forwardly and rearwardly. The free ends of these rear links (7a), (7b) are suspended downwardly and connected by a shaft pin (9) to the rear ends of the two sides of the cushion frame (2).

Between the front ends of the side brackets (6) there is journaled a rod (10) to the right and left portions of which link members (11) and (12) are respectively fixed in their respective first ends thereof. The link members (11), (12) are respectively pivotally mounted in the connecting holes (11a), (12a) formed in the free ends thereof to the front ends of the two sides of the cushion frame (2) by means of a shaft pin (13).

The two link members (11) and (12) are respectively formed with arc-shaped slits (14) and (15) which are curved projectingly in the direction where they are fixed to the rod (10). The slits (14), (15) are identical in shape with each other and are located so as to correspond crosswise and symmetrically to each other.

On the other hand, the side brackets (6) are formed with vertically extending elongated holes (16) above the journaled portions of the rod (10) in the front ends thereof, respectively, and the crankshaft (17) is inserted through and supported by the two elongated holes (16).

The crankshaft (17) is provided on the mutually 180° opposing right and left portions thereof with substantially U-shaped bent portions (18) and (19). One (18) of them is inserted through and engaged with the slit (14) in the one link member (11), while the other (19) is inserted through and engaged with the slit (15) in the other link member (12).

Also, the crankshaft (17) is provided with two preventive members (20) respectively fitted over the two ends thereof to prevent the two ends against removal. Two torsion coil springs (22) are respectively compressed and interposed between grooves formed in the two removal preventive members (20) and projections (21) provided in the lower portions of the outer side surfaces of the side brackets (6). The biasing forces of the two torsion coil springs (22) are always pushing up the crankshaft (17). In other words, the crankshaft (17) is always energized in such a manner that both ends thereof are pressed against the upper edges of the elongated holes (16), and the bent portions (18) and (19) thereof are pressed against the end edges of the slits (14), (15) in the link members (11), (12).

Also, an operation knob (23) is attached to the extreme end of one end portion of the crankshaft (17), so that the crankshaft (17) can be rotated by means of operation of the operation knob (23).

Next, we will describe the operation of the seat incorporating therein the present adjustment device constructed in the above-mentioned manner.

When the two link members (11), (12) of the present adjustment device (4) are in their neutral positions, respectively, the cushion frame (2) is in an intermediate position relative to the side brackets (6) and, therefore, the depth of the seat cushion is maintained in its normal condition.

In this state, one bent portion (18) of the crankshaft (17) is in engagement with the rear end (14b) of the slit (14) in one link member (11) and the other bent portion (19) is in engagement with the front end (15a) of the slit (15) in the other link member (12); the two link members (11), (12) are locked and unrotatable since the crankshaft (17) is energized upwardly by the biasing forces of the torsional coil springs (22) with the bent portions (18), (19) thereof being respectively pressed against the terminal edges of the slits respectively pressed against the terminal edges of the slits (14), (15), (FIG. 4); and thus the cushion frame (2) is held at an intermediate position in the longitudinal direction.

Figure 5:
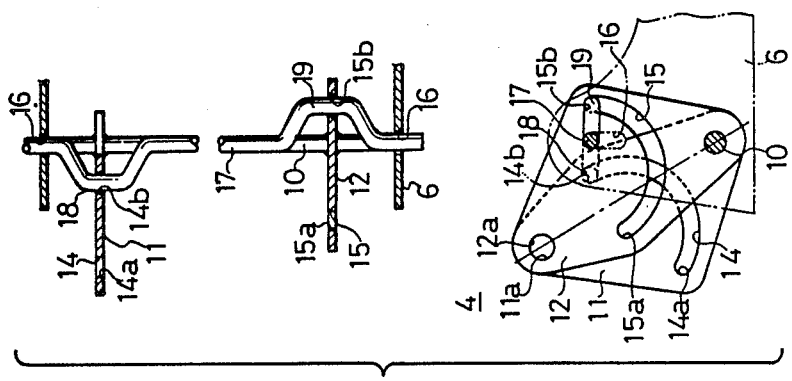
Figure 4:
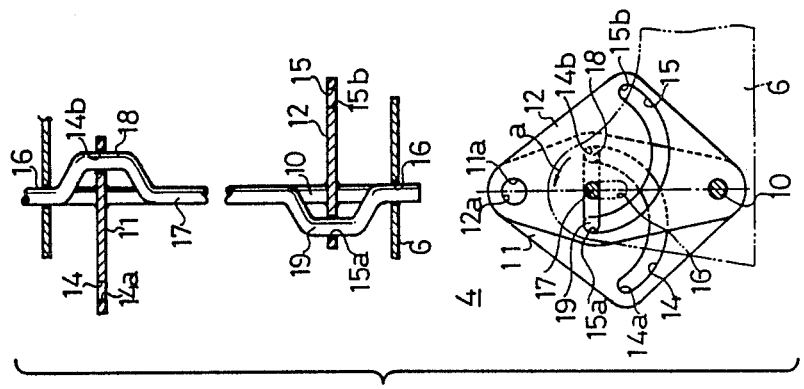

From this state, if the crankshaft (17) is rotated 180° in one direction, e.g., in a counterclockwise direction (in a direction of an arrow a) in FIG. 4 by operating the operation knob (23), then one bent portion (18) of the crankshaft (17) is caused to press against the rear end (14b) of the slit (14) in one link member (11), so that one link member (11) is inclined or rotated forwardly about the rod (10). At the same time, the other link member (12) is also rotated integrally with one link member (11) since the other bent portion (19) of the crankshaft (17) is moved through the slit (15) from the front end (15a) to the rear end (15b) thereof, (FIG. 5). In this operation, the crankshaft (17) is rotated while it moves through the elongated holes (16) against the biasing forces of the torsional coil springs (22).

Such forward rotational movements of the two link members (11), (12) push out the cushion frame (2), and, following this, the rear links (7a), (7b) are rotated forwardly about the shaft (8) to move the cushion frame (2) forwardly with respect to the side brackets (6), so that the depth dimension of the sitting surface of the seat cushion is set large. In this state, since the bent portions (18), (19) of the crankshaft (17) are respectively in engagement with rear ends (14b), (15b) of the slits (14), (15) in the link members (11), (12), the link members (11), (12) are prevented from rotating further forwardly, so that the cushion frame (2) will never pushed out unncessarily or lowered in height.

In order to return the cushion frame (2) from this state to its normal position, the operation knob (23) may be operated or rotated 180° in the opposite direction of the arrow a. That is, both link members (11) and (12) are rotated rearwardly by means of a reversed operation to the above-mentioned operation to move the cushion frame (2) rearwardly, so that the seat cushion returns to its normal condition in depth.

Also, from this normal condition, if the operation knob (23) is rotated 180° further in the opposite direction of the arrow a, then the depth of the sitting surface of the seat cushion can be adjusted to a small dimension.

Figure 6:
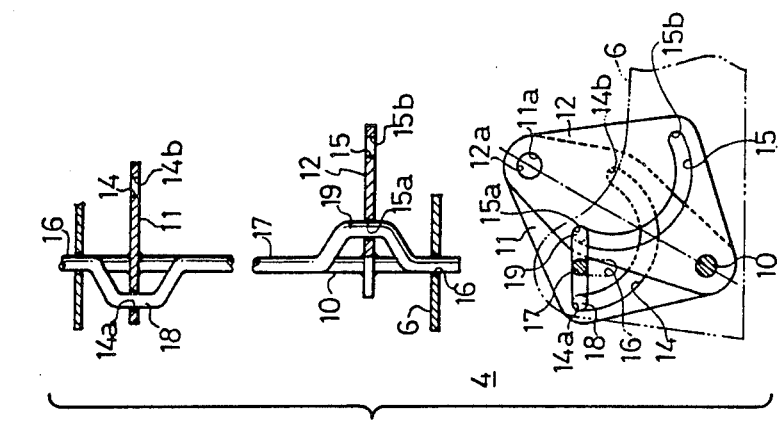
FIGS. 4 to 6 are respectively explanatory views to show the operation of the invention.

In other words, if the carnkshaft (17) is rotated in the opposite direction of the arrow a from the state shown in FIG. 4, then the other bent portion (19) of the crankshaft (17) is pressed against the edge of the front end (15a) of the slit (15) in the other link member (12) rearwardly to thereby rotate the other link member (12) rearwardly about the rod (10), and at the same time, one bent portion (18) of the crankshaft (17) is moved through the slit (14) from the rear end (14b) to the front end (14a) thereof to thereby rotate one link member (11) integrally with the other link member (12) without hindrance, (FIG. 6). In this operation as well, the crankshaft (17) is similarly rotated while it is moved through the elongated holes (16) against the biasing forces of the torsional coil springs (22).

Such rearward rotational movements of the two link members (11) and (12) move the cushion frame (2) rearwardly relative to the side brackets (6), thereby setting the depth of the sitting surface of the seat cushion in a small dimension. In this state as well, the link members (11), (12) are prevented from rotating further rearwardly by an operation similar to that mentioned above in connection with the forward rotational movements thereof, so that the cushion frame (2) is engaged and retained in this position.

To return the cushion frame (2) from this condition to its normal position, the operation knob (23) may be rotated 180° in the opposite direction, that is, in the direction of the arrow a.

As explained above, in the seat incorporating the adjustment device of the invention, the depth of the sitting surface of the seat cushion can be adjusted arbitrarily according to the taste or physical conditions of the occupant of the seat simply by rotating the operation knob (23), and the operation knob (23) may be rotated right or left by 180°, that is, it can be operated with one revolution only, which means that the operation of the knob (23) is quite easy. In the present adjustment device (4), since the bent portions (18), (19) of the crankshaft (17) are respectively inserted through and engaged with the slits (14), (15) in the two link members (11), (12) and thus the cushion frame (2) is locked on both sides thereof; a stronger locking can be obtained and loose conditions or the like will hardly occur. In addition, the present device (4) is simple in structure. Therefore, the invention can reduce the weight of the whole seat and the costs thereof.

Although, in the illustrated embodiment, the present invention is applied to a seat as an adjustment mechanism to adjust the depth of the seat cushion of the seat, the invention is not limited to this, but may be applied as any of various adjustment mechanisms in the seat, such as a height mechanism, a headrest longitudinal adjustment mechanism or the like.

As has been described hereinbefore, according to the invention, a movable-side member can be moved or adjusted relative to fixed-side members by a simple operation or simply by rotating a crankshaft. Also, the two bent portions of the crankshaft are respectively inserted through and engaged with arc-shaped slits formed in two link members, so that the movable-side member is locked on the two sides thereof. For this reason, the invention can provide a greater locking strength and reduces a possibility that loose conditions or the like may occur. In addition, the invention is simple in contruction. In other words, the invention has a great practical effect in that it can reduce the weight of the seat and the manufacturing costs thereof.

What is claimed is:

1. An adjustment device for use in a vehicle seat comprising fixed-side means, a rod journaled by said fixed-side means, a pair of link members each having an arc-shaped slit and each being fixed to said rod, free ends of said link members being connected to a movable-side member, a crankshaft having a pair of bent portions on substantially 180° opposing sides thereof being provided on said fixed-side means, said bent portions of said crankshaft being respectively inserted through and engaged with said slits in said link members, whereby said crankshaft in rotated to rotate said link members so as to move or adjust said movable-side member relative to said fixed-side means.

2. An adjustment device for use in a vehicle seat comprising fixed-side means, a rod journaled by said fixed-side means, a pair of link members each having an arc-shaped slit and each being fixed to said rod, free ends of said link members being connected to a movable side member, a crankshaft having a pair of bent portions on substantially 180° opposing sides thereof being provided on said fixed-side means, said bent portions of said crankshaft being respectively inserted through and engaged with said slits in said link members, wherein said fixed-side means comprises a pair of side brackets respectively fixed to a pair of right and left side rails, said moveable-side member is a cushion frame, said rod is rotatably journaled between the front ends of said pair of brackets, and the free ends of said pair of link members fixed to said rod are rotatably mounted on opposite sides of said cushion frame, respectively, whereby said crank shaft is rotated to rotate said link members so as to move or adjust said moveable-side member relative to said fixed-side means.

3. An adjustment device for use in a vehicle seat comprising fixed-side means, a rod journaled by said fixed-side means, a pair of link members each having an arc-shaped slit and each being fixed to said rod, free ends of said link members being connected to a moveable side member, a crankshaft having a pair of bent portions on substantially 180° opposing sides thereof being provided on fixedside means, said bent portions of said crankshaft being respectively inserted through and engaged with said slits in said link members, wherein said fixed-side means comprises a pair of side brackets respectively fixed to a pair of right and left side rails, and said moveable-side member is a cushion frame, and wherein the rear ends of said side brackets are connected to said cushion frame by means of links, whereby said crankshaft is rotated to rotate said link members so as to move or adjust said moveable-side member relative to said fixed-side means.

4. An adjustment device for use in a vehicle seat as claimed in claim 1, wherein one of said bent portions is inserted through and engaged with the front end of said slit in one of said link members while the other bent portion is inserted through and engaged with the rear end of said slit in the other link member.

5. An adjustment device for use in a vehicle seat as claimed in claim 1, wherein an operation knob is attached to the extreme end of one end portion of said crankshaft and said crankshaft can be rotated by operating said operation knob.

6. An adjustment device for use in a vehicle seat comprising fixed-side means, a rod journaled by said fixed-side means, a pair of link members each having an arc-shaped slit and each being fixed to said rod, free ends of said link members being connected to a moveable side member, a crankshaft having a pair of bent portions on substantially 180° opposing sides thereof being provided on said fixed-side means, said bent portions of said crankshaft being respectively inserted through and engaged with said slits in said link members, wherein two removable preventive members are respectively fitted over the two end portions of said crankshaft, and two torsional coil springs are respectively compressed and interposed between grooves formed in said removal preventive members and projections provided in the lower portions of the outer surfaces of a pair of side brackets, respectively fixed to a pair of right and left side rails, whereby said crankshaft is being always pushed up by the biasing forces of said torsional coil springs so that the two end portions thereof are pressed against elongated holes formed in said side brackets and said bent portions thereof are pressed against the terminal edges of said slits in said two link members.

* * * * *